Sept. 19, 1967 B. E. ATTWOOD 3,343,006

FIELD TIME-BASE CIRCUIT ARRANGEMENT

Filed March 2, 1966 2 Sheets-Sheet 1

INVENTOR.
BRIAN E. ATTWOOD
BY
Frank R. Trifari
AGENT

INVENTOR.
BRIAN E. ATTWOOD
BY
Frank R. Trifari
AGENT

United States Patent Office 3,343,006
Patented Sept. 19, 1967

3,343,006

FIELD TIME-BASE CIRCUIT ARRANGEMENT

Brian Ernest Attwood, Horley, Surrey, England, assignor to North American Philips Company, Inc., New York, N.Y., a corporation of Delaware Filed Mar. 2, 1966, Ser. No. 531,299
Claims priority, application Great Britain, Nov. 22, 1965, 8,849/65
5 Claims. (Cl. 307—88.5)

ABSTRACT OF THE DISCLOSURE

The disclosure describes a field time base for a television system, in which the output stage is operated as a class D stage. A sawtooth sweep developed across a capacitor charging circuit is converted to a pulsatory wave of varying frequency (and pulse width) as a function of the sawtooth amplitude, by means of a breakdown device such as a pnpn diode. The pulsatory wave is applied to the deflection coils by way of a push-pull semiconductor amplifier and an integrating circuit.

Figure 1:
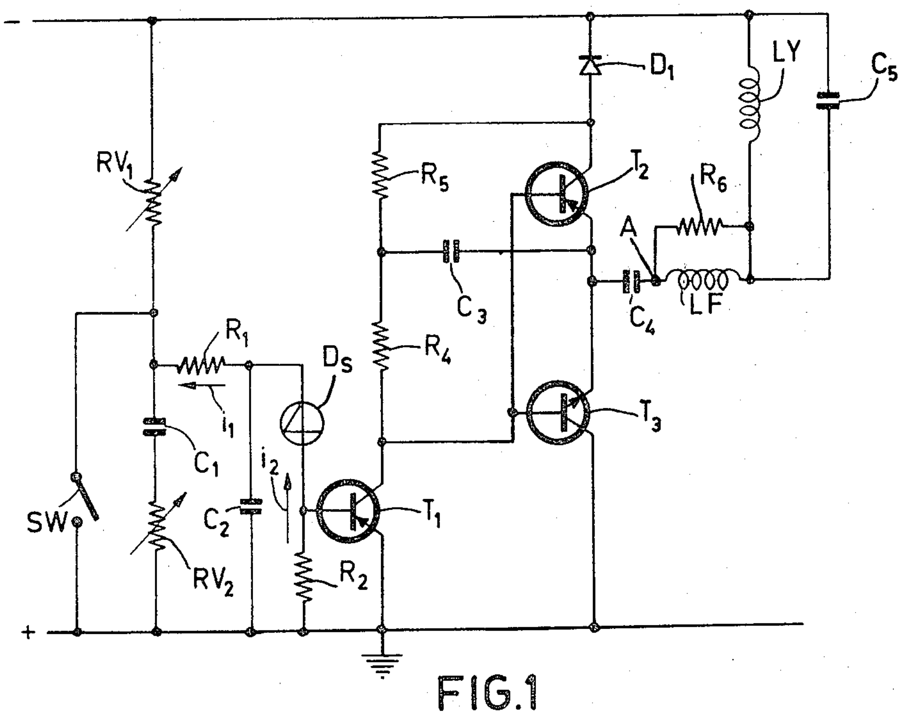

The invention relates to a circuit arrangement for converting a variable voltage into a pulse voltage which is modulated in frequency and, as the case may be, in duration.

In many uses it is advisable to cause the transistors in a circuit arrangement to operate on the class D-amplifier principle (Chopper amplifier), in which the variable voltage, for example an audio-frequency signal, a sawtooth control-voltage and the like are first converted into a pulsatory voltage, whose repetition frequency or pulse duration or both are varied as a function of the variation of the voltage to be converted.

This has the advantage that by means of the resultant pulsatory control-voltage the transistor of the final stage concerned is driven in the saturated state or cut off so that the natural dissipation of this transistor is minimized.

A particular embodiment of such a final stage will be described with reference to a frame time base arrangement employed in television receivers.

The conventional frame time base arrangement comprising semiconductors for use in a television receiver usually comprises three stages: a generator for producing a sawtooth voltage, a control stage and an output stage. In such an arrangement the second stage and the third stage are connected in class A. The output stage usually comprises a transistor having a high power of dissipation, which is coupled through a choke and a transformer to the deflection coils.

A characteristic value of the dissipation of the output stage is 6 w. for a 25 kv. 90° colour display tube. Recently output states connected in class B have been designed, in which neither a choke nor a transformer are required, so that the useful effect is raised. However, the output stage requires nevertheless transistors of high dissipation power; a typical average value of the nominal dissipation is 1.5 w. for each transistor (in total 3 w.) if a colour display tube of the kind mentioned above is employed.

The object of the present invention is to provide a simple conversion stage by which the voltage can be converted into a pulsatory voltage having either a varying repetition frequency or both a varying repetition frequency and a varying pulse duration.

The circuit arrangement according to the invention is characterized in that it comprises the series combination of a resistor and a capacitor, to which combination the voltage to be converted is applied, whilst in parallel with the capacitor there is connected the series combination of a break-down element and a further resistor, the output voltage being derived from the last-mentioned resistor.

The converting stage according to the invention has particular advantages for the aforesaid field time base circuit arrangement, since herein a sawtooth voltage of about 50 to 60 c./s. is employed as a control signal to produce finally a sawtooth current across the deflection coil.

This sawtooth voltage of comparatively low repetition frequency can be very readily converted in a conversion stage according to the invention into the desired modulated pulsatory voltage.

For this purpose, according to a further aspect of the invention, a conversion arrangement according to the invention is employed in a field time base arrangement which comprises in conjunction an output stage, a charging circuit including a charging capacitor, across which a sawtooth-like control-voltage during the scanning period, an oscillator having a discharging circuit connected across said capacitor for discharging periodically the charging capacitor during the fly-back period.

This time base arrangement is characterized in that the sawtooth control-voltage produced is applied to the conversion circuit, whilst the pulses produced across the last-mentioned resistor of the conversion circuit are applied for control to said output stage, so that the relevant semi-conductor is either driven in the saturated state or cut off.

The semi-conductor in the output stage may be four-layer semi-conductors or transistors driven as switches, that is to say transistors controlled so that they are either cut off or driven in the saturated state.

In contrast to a time base connected in class A or B experiments have shown that it is sufficient to use small, cheap transistors having a power of dissipation of only 120 mw. each for scanning a 90° colour display tube of 25 kv. high-voltage in a field output stage comprising class D-connected transistor driven as a switch. Moreover, 110° 18 kv. monochrome display tubes can be scanned with a dissipation of about 90 mw. per output transistor.

An embodiment of an arrangement according to the invention preferably employed in a television receiver will now be described with reference to the drawing, in which FIG. 1 shows the circuit arrangement and FIG. 2 the relevant control-circuitry and FIGS. 3, 4, 5 and 6 serve for further explanation.

Figure 2:
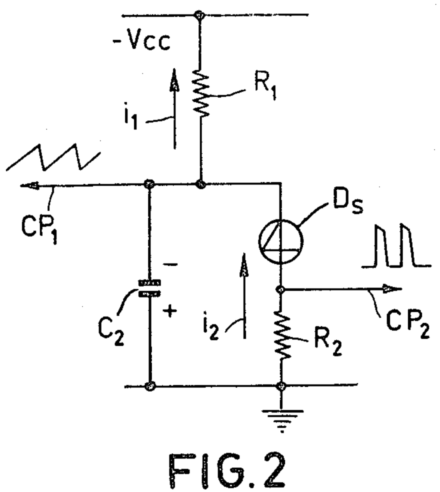

Before explaining the arrangement shown in FIG. 1 it may be useful to describe the two modes *a* and *b* of operation of the arrangement shown in FIG. 2 for the conversion or the control.

In mode *a* use is made of the conventional frequency modulation; in mode *b* pulse width modulation is employed, which is joined to a given extent to the primary frequency modulation.

The control-circuitry includes preferably a switching element which is capable of conducting at a breakdown voltage which is essentially independent of the temperature and the applied voltage, which switching element may be in a non-conducting state and in a conducting state. Such a switching element is connected in parallel with a charging capacitor and in series with a resistor, through which resistor the capacitor is charged to the value of the breakdown voltage. Switching elements capable of breaking down may be the four-layer diodes of the Shockley type and the so-called unijunction transistors.

It will appear that such a simple and cheap control-circuitry is capable of fulfilling together four functions, i.e., (A) That of an oscillator,
(B) That of supplying a constant reference voltage,
(C) That of providing an uninterrupted amplification,
(D) That of a pulse frequency modulator or of a mixed pulse frequency and pulse width modulator.

An example of such a circuitry is illustrated in FIG. 2. It includes a two-terminal p-n-p-n-diode D*s* having four layers used as a control-element, since this type of diode fulfills most of the essential requirements for a sensitive control-element.

The modes *a* and *b* will be explained with reference to FIG. 2; first mode *a* will be dealt with.

If the voltage V*cc* at the end of the resistor R1 remote from the capacitor is a sawtooth-like voltage of the kind illustrated in FIG. 4*a*; the voltage V*c*2 across the capacitor C2 (at the terminal C*p*1 in FIG. 2 to ground) will have the waveform shown in FIG. 4*b*. The current $i_{Ds}$ across the series combination of D*s* and R2 and hence also the voltage VR2 across the resistor R2 may be represented by a pulse sequence of varying frequency as is shown in FIG. 4*c*. This may be accounted for as follows.

For mode *a* it is assumed that R1 is high with respect to R2; R1 may be for example 25K ohms and R2 100 ohms. It may therefore be said that, when the diode D*s* is conducting, the discharging current of capacitor C2 across the diode D*s* and the resistor R2 is many times higher than the current supplied via R1 so that only the decreasing voltage across the capacitor C2 and the value of the resistor R2 determine when the current *i*D*s* of the diode D*s* drops below the holding value $i_H$, at which instant the diode D*s* changes over to the non-conducting state.

If the voltage V*cc* gradually increases from the instant $t_0$ the voltage V*c*2 of the capacitor C2 will follow (more or less exponentially) with a less steep slope, since the charging current of the capacitor C2 will produce a given amount of voltage drop across the resistor R1. When for the first time, at the instant *t*1, the breakdown voltage VD of the diode D*s* is attained, breakdown takes place so that the capacitor C2 is discharged through the diode D*s* and the resistor R2. At the instant $t_2$ the $i_{Ds}$ drops below the holding current $i_H$, so that the discharge ceases. At this instant the voltage V*cc* has already attained a value V1, so that the available voltage for the network R1, C2 is higher at the instant *t*1 than at the instant *t*0. The voltage of capacitor C2 will have a steeper course during the subsequent lapse of time *t*2—*t*3 than during the lapse of time *t*0—*t*1. Therefore, the breakdown voltage VD is attained earlier so that the period of time from *t*3 to *t*2 is shorter that the time from *t*1 to $t_0$. However, when the voltage VD has once been reached, the discharge of the capacitor $C_2$ is again completely determined by the resistor $R_2$, so that $$t_4-t_3=t_2-t_1$$

wherein $t_4$ is the instant when for the second time the current $i_{Ds}$ drops below the holding value $i_H$. At the instant $t_4$ the voltage $V_{cc}$ has reached the value $V_2$ which is higher than the value $V_1$ at the instant $t_2$. During the next interval $t_4-t_5$ the voltage variation across $C_2$ will be steeper than in the interval $t_2-t_3$, so that $$t_5-t_4<t_3-t_2$$

Henceforth a gradually decreasing charging time is found for the capacitor $C_2$, while the discharging time remains the same.

Since the current $i_{Ds}$ produces a voltage drop $VR_2$ across the resistor $R_2$ a pulse sequence is produced across resistor $R_2$, which has constant pulse duration but decreasing pauses $(t_1-t_0)>(t_3-t_2)>(t_5-t_4)$ . . . between these pulses. This voltage $VR_2$ is available at the terminal $CP_2$. This process continues until at the instant $t_e$ the sawtooth voltage $V_{cc}$ decreases again to zero value (or substantially zero), after which at the instant to a new cycle starts. Since the breakdown voltage $V_{bo}$ of the diode $D_s$ is constant, the capacitor $C_2$ is always charged to the same value VD.

In this manner the conventional frequency modulation (mode *a*) is obtained.

The output voltage of the control-circuit of FIG. 2 may, if necessary, be applied through an amplifier or a buffer stage to the push-pull connected output stage as is illustrated in FIG. 1. If the output voltage across the resistor $R_2$ is used, this output voltage may, in some cases, be directly applied to the output stage.

The other mode *b* will also be described with reference to FIG. 2.

It is supposed above that the resistor $R_1$ is high with respect to the resistor $R_2$, but here the resistor $R_1$ is considerably smaller. This reduction is such that at the maximum value of the voltage $V_{cc}$ (at the instant $t_e$ in FIG. 4*a*) the overall resistance value $(R_1+R_2)$ is so high that the current determined by $$V_{cc_{max}}/R_1+R_2$$

is lower than the holding current of the diode $D_s$.

Due to the reduction of $R_1$ it is no longer true that, when the diode $D_s$ becomes conducting, the current across the circuit $R_2$, $D_s$, $C_2$ is high with respect to the current supplied via the resistor $R_1$. This means that the discharge of $C_2$ will take more time, since, although a charge will be conducted away from $C_2$ via $D_s$ and $R_2$, new charge is supplied simultaneously via $R_1$ to $C_2$. Since the breakdown voltage VD of the diode $D_s$ remains constant, the potential difference across the resistor $R_1$ will increase constantly during the lapse of time from $t_0 \rightarrow t_e$. Therefore, the supply of charge via the resistor $R_1$ during the intervals $t_1 \rightarrow t_2$, $t_3 \rightarrow t_4$, $t_5 \rightarrow t_6$, and so on, during which the diode $D_s$ is conducting, will rise constantly. Consequently the period of conduction of the diode $D_s$ increases during each time interval from $t_0 \rightarrow t_e$. In other words the pulse duration $t_1 \rightarrow t_7$ increases constantly (see FIG. 5 in which $t_1 \rightarrow t_7$ represents the constantly increasing pulse duration and $t_1-t_2$ the constant duration associated with $R_1 \gg R_2$). Apart from the frequency variation described above with reference to FIG. 4, a pulse duration increase is obtained in mode *b*. This effect may be enhanced by increasing the value of resistor $R_2$. The current through the circuit $R_2$, $C_2$, $D_s$ is thus reduced, so that the drainage of charge from $C_2$, when the diode $D_s$ is conducting, is further reduced, which involves a further increase in the pulse duration $t_1 \rightarrow t_7$. It will be obvious that, as stated above, the reduction of $R_1$ and the increase of $R_2$ should never be such that, when the diode $D_s$ is conducting, the supply of charge via $R_1$ exceeds the drainage via $R_2$, since otherwise $D_s$ could no longer become non-conducting, so that it must always be true that $i_1<i_2$, wherein $i_1$ is the current through the resistor $R_1$ and $i_2$ is the current through the resistor $R_2$.

If the voltage illustrated in FIG. 4*a* is a field sawtooth voltage or a vertical sawtooth voltage, the resultant pulse frequency depends upon said sawtooth voltage. This is true when the switch SW of FIG. 1 is periodically closed in the rhythm of the field frequency. For this purpose the switch SW may be a transistor connecting as a blocking oscillator or receiving field synchronizing pulses for rendering this transistor periodically conducting. The voltage $V_{c1}$ at the junction of the resistor $R_1$ and the capacitor $C_1$ should substantially not be deformed by the load connected thereto (elements $R_1$, $R_2$, $C_2$). This can be ensured by choosing the capacitor $C_1$ to be great and the resistors $R_{v1}$ to be small for a given time constant R*v*1C1. A different type of sawtooth oscillator, for example a Miller transitron oscillator may be employed for producing the voltage ilustrated in FIG. 4*c*.

The control-pulses modulated by mode *a* or mode *b* may be applied, as stated above, either directly or via one or more suitable amplifying stages to the output stage of the time base.

In the embodiment shown in FIG. 1 the output stage is formed by a pseudo-push-pull arrangement comprising transistors $T_2$, $T_3$, which are controlled via an intermediate stage $T_1$.

An output (here $CP_2$) of the conversion stage (elements $R_1$, $R_2$, $C_2$, $D_s$) is connected to the base of the transistor $T_1$, which operates as a limiting amplifier.

Figure 3:
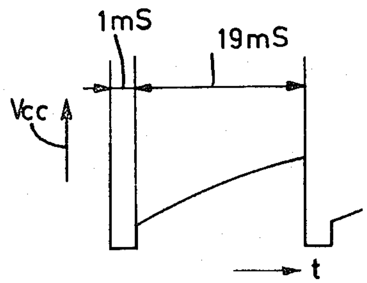
Figure 4:
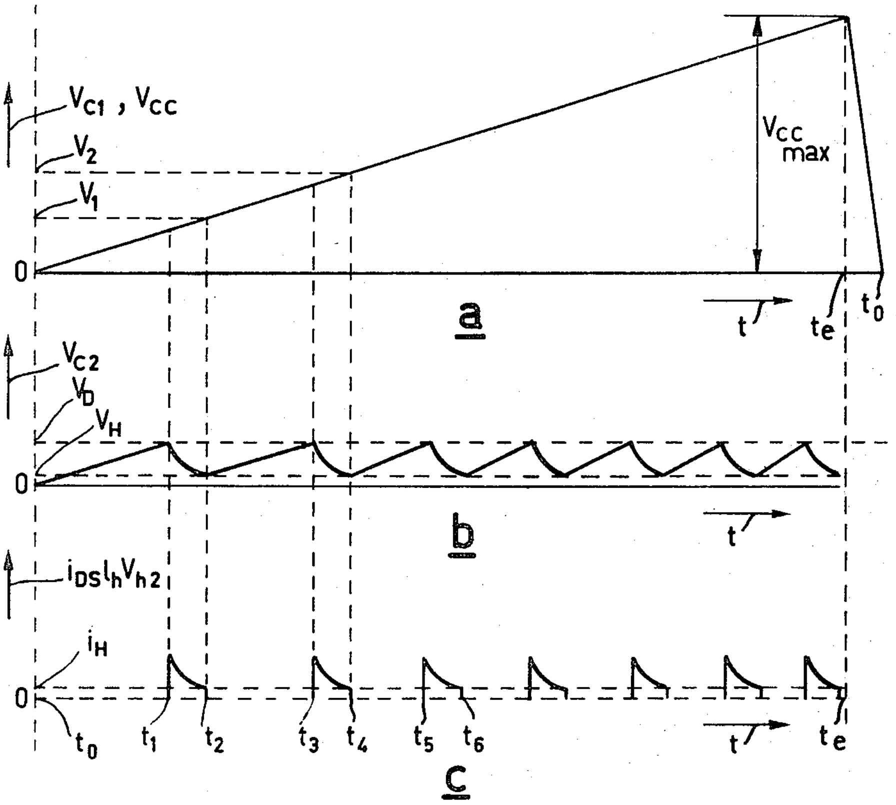
Figures 5, 6:
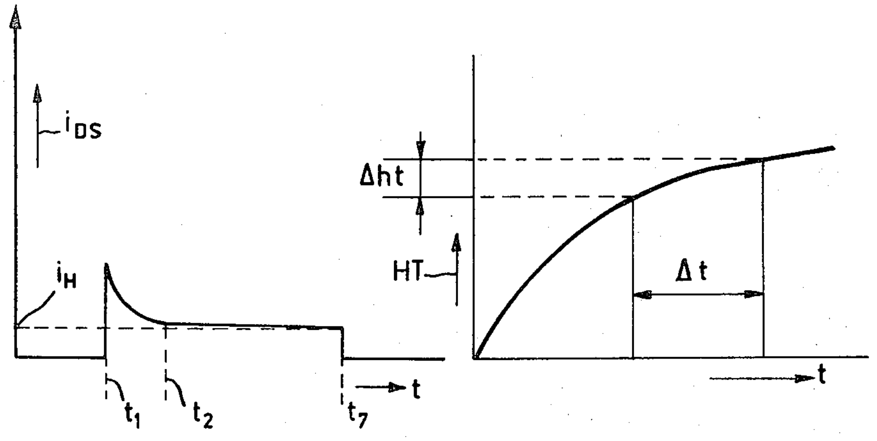

It should be noted that it is necessary that at each beginning of a vertical scan the conversion stage starts operating immediately. This may be achieved by providing a voltage jump in the sawtooth voltage $V_{cc}$, available at the junction $Rv_1-C_1$. This voltage $V_{cc}$ is illustrated in FIG. 3.

The voltage jump must exceed the breakdown voltage ($V_{bo}$) of the diode $D_s$. Said voltage jump is obtained by including the resistor $RV_2$ in series with $C_1$ as is indicated in FIG. 1. By means of the variable resistor $RV_2$ the desired value of said voltage jump can be adjusted. As an alternative, a bias voltage may be applied to the diode $D_s$ by means of a potentiometer connected to the supply source. The voltage jump ensures moreover that during the vertical fly-back period no pulses appear.

The pulses amplified and limited in transistor $T_1$ are applied to the complementary pair of output transistors $T_2$ and $T_3$. These pulses drive alternately one of the two transistors in the saturated state. When one of the transistors is in the saturated state, the other is cut off. They consequently operate as a switch so that their own dissipation is at a minimum. The output pulses are derived from the junction of the emitters of $T_2$ and $T_3$.

A capacitor $C_3$ is provided for accelerating the switching operation of $T_2$, $T_3$, so that the dissipation during the transition period between the bottoming period and the cut-off instant is reduced.

The output pulses of $T_2$, $T_3$ are applied via a coil LF to the vertical deflection coils *Ly*.

The coil LF serves on the one hand to reduce the high-frequency current across C5, which forms practically a short-circuit for the signals of double the line frequency (C5 is provided for adjusting the deflection coils *Ly* to the correct fly-back time).

On the other hand the capacitor C5 serves to ensure that only very slight high-frequency components appear across the deflection coils.

The coil LF, however, is fairly small. The typical value of its self-induction lies between 600 $\mu$h. and 1 mh. If pulses of the waveform illustrated in FIG. 4*c* are applied to the LF, that is to say pulses obtained by the mode *a* or else pulses obtained by the mode *b*, a sawtooth voltage will be produced, due to the integrating effect of LF, R6 and C5, across the deflection coils *Ly*.

The operation during the fly-back period is as follows: At the beginning of the fly-back period the discharge path SW of the oscillator is conducting and due to the voltage jump illustrated in FIG. 3 the junction of C–RV1 is brought fairly directly to ground potential. This voltage jump is applied to D*s*, which is thus cut off during the fly-back period, so that the transistors T1 and T3 are cut off. The energy accumulated in the inductance of the deflection coils *Ly* will cause the voltage at point A to increase in the negative sense. Since R4 is connected via C3 to C4 and hence to A, the voltage at the base (and the emitter) of T3 also becomes negative, so that T3 is cut off. Also the voltage at the base of T2 increases in a negative sense, so that this transistor becomes conducting. This would, of course, prevent a rapid fly-back, since the emitter of T2 would, in fact, be held at the value of the supply voltage, so that the fly-back of the voltage across the deflection coils would be damped. However, when a diode D1 is included in the collector lead of T2, a cut-off is obtained as soon as the anode voltage of said diode becomes more negative than the supply voltage. Since the connection of T2 and T1 to the supply line is interrupted by D1, T3 as well as T1 will be cut off. Since the resonant circuit *Ly*–C5 is tuned to the fly-back frequency, that is to say to a period of about 1 msec., the voltage across *Ly*–C5 may be enhanced within half a sine wave to a high value. As soon as the voltage across the deflection coils *Ly* is inverted and drops below the supply voltage, D1 and T2 become conducting, while the voltage across the deflection coils is held until the current across the coils is reverted.

Since the transistors T2 and T3 are alternately conducting and non-conducting, the current of LF inverts its direction in the rhythm of the pulse frequency determined by the control-pulses at the base of transistor T1. Therefore, the voltage of LF tends, towards the termination of the scan, to become more negative than the supply voltage. This applies virtually by the provision of the diode D1 in the collector circuit of $T_2$. This involves non-linearity of the scan, since the level of the 50 c./s. sawtooth voltage across *Ly* varied in an undesirable manner. This avoided by connecting a resistor R6, for example a voltage-dependent resistor, in parallel with LF. The result is better than that of the parallel connection of a capacitor with the diode D1, since the latter might affect the fly-back oscillation. The switching time of the transistors T1, T2, T3 may be further reduced by providing a feed-back through a secondary winding coupled with the coil LF and connected to the base of T1, the polarity being such that the switching operation is supported. The small improvement thus obtained will, however, usually not compensate the complication of an additional winding.

It should finally be noted that the problem of the distortion produced in class B amplifiers by the overlap of the characteristic curves does not arise when transistors in class D are driven as switches.

By way of example a survey of parts and values suitable for a practical embodiment of the circuit arrangement shown in FIG. 1 is given below.

Transistor T1=type ACV 17, Mullard
Transistor T2=type OC 81, Mullard
Transistor T3=type BFY 50, Mullard
Diode D1=OA10, Mullard
Diode D*s*=type 4D 20/3, Brush Clevite,
Deflection coil *Ly*=21 mh., resistance 9 ohms
Coil LF=600 $\mu$h.
Capacitor C1=50 $\mu$f.
Capacitor C2=about 0.01 $\mu$f.
Capacitor C3=200 $\mu$f.
Capacitor 4=2000 $\mu$f.
Capacitor C5=1 $\mu$f.
Resistor RV1=10K ohms
Resistor RV2=18 ohms
Resistor R1=25K ohms, variable
Resistor R2=about 100 ohms
Resistor R4=390 ohms
Resistor R5=100 ohms
Resistor R6=about 330 ohms.

The linearity of the arrangement of FIG. 1 is satisfactory, even without the use of additional parts. In given limit cases or in the case of disturbances an excessively high base current may flow via transitor T1 to transistor T3. The arrangement may be safeguarded by providing additional parts. For example a small resistor (500 ohms) may be included in the base circuit of T3 or in the emitter circuit of T1. The linearity is slightly disturbed in this way, it is true, but this may be remedied by including also a small resistor (for example 5 to 10 ohms) in the collector circiut of T3. This resistor provides, in addition, a certain degree of safety in the event of a breakdown of the transistor T2 or T3.

The oscillator SW may be a blocking oscillator or a trigger p-n-p-n-transistor.

Although the arrangement shown in FIG. 1 employs transistors T1 to T3, an essentially similar arrangement may be designed which employs, instead of transistors, four-layer semi-conductors, for example controlled silicon rectifiers, operating as gating circuits.

The output stage formed by the pseudo-push-pull circuit may be modified so that the transistors T2, T3 are of the same conductivety type. In this case the control of the two transistors may be carried out by means of a phase inverting stage, for example a transformer. Instead of a push-pull circuit, a circuit having only one semiconductor and a choke may be employed.

Although in the foregoing the voltage V*cc* is supposed to be a sawtooth voltage, any other varying voltage may of course, be applied to the arrangement shown in FIG. 2. V*cc* may be an audio-frequency signal, so that a frequency-modulated pulsatory signal is produced at the output CP2, which signal is applied subsequent to amplification and integration (like described above for the sawtooth voltage) to a loud speaker which reproduces the audio-frequency signal. This also has the advantage that the output transistors operate as switches so that they dissipate little.

What is claimed is:

1. A time base circuit comprising a first series circuit of a first resistor and first capacitor, a second series circuit of a breakdown device and a second resistor, said breakdown device being of the type having a constant breakdown voltage, means connecting said second series circuit in parallel with said first capacitor, a third series circuit of a third resistor and a second capacitor, a source of operating potential connected to said third series circuit whereby said second capacitor charges through said third resistor, means connected in parallel with said second capacitor for periodically discharging said second capacitor, means connecting said first series circuit in parallel with said second capacitor, said first series circuit having a time constant with respect to the time constant of the third series circuit and the breakdown voltage of the breakdown device that voltage across said first capacitor attains said breakdown voltage and said first capacitor is discharged a plurality of times for each discharge of said second capacitor, whereby a series of voltage pulses having a repetition period dependent upon the instantaneous amplitude of the voltage across said second capacitor is produced across said second resistor, and an output circuit connected to said second resistor.

2. The circuit of claim 1 in which said output circuit comprises first and second transistors, a source of operating potential having first and second terminals, diode means, means connecting the emitter-collector paths of said first and second transistors, and said diode means, serially in that order between said first and second terminals, a series circuit of integrating circuit means and load means connected between said second terminal and the junction of the emitter-collector paths of said transistors, and means for applying said pulses to the bases of said transistors.

3. The circuit of claim 1 in which said breakdown device is a p-n-p-n diode.

4. A time base circuit comprising a first series circuit of a first resistor and first capacitor, a second series circuit of a breakdown device and a second resistor, said breakdown device being of the type having a constant breakdown voltage, a third series circuit of a third resistor and second capacitor, a source of operating potential connected to said third series circuit whereby said second capacitor charges through said third resistor, means connected in parallel with said second capacitor for periodically discharging said capacitor whereby a sawtooth waveform voltage is produced across said second capacitor, means connecting said first series circuit in parallel with said second capacitor, means connecting said third series circuit in parallel with said first capacitor, said first series circuit having a time constant with respect to the period and amplitude of said sawtooth waveform voltage that the voltage across said first capacitor exceeds the breakdown voltage of said breakdown device a plurality of times for each cycle of said sawtooth waveform voltage, whereby said first capacitor is discharged through said breakdown device to produce a series of voltage pulses across said second resistor having a period dependent upon the instantaneous amplitude of said sawtooth waveform voltage, and an output circuit connected to said second resistor, said first resistor having a large resistance with respect to the resistance of said second resistor whereby said voltage pulses have substantially constant widths.

5. A time base circuit comprising a first series circuit of a first resistor and first capacitor, a second series circuit of a breakdown device and a second resistor, said breakdown device being of the type having a constant breakdown voltage, a third series circuit of a third resistor and second capacitor, a source of operating potential connected to said third series circuit whereby said second capacitor charges through said third resistor, means connected in parallel with said second capacitor for periodically discharging said capacitor whereby a sawtooth waveform voltage is produced across said second capacitor, means connecting said first series circuit in parallel with said second capacitor, means connecting said third series circuit in parallel with said first capacitor, said first series circuit having a time constant with respect to the period and amplitude of said sawtooth waveform voltage that the voltage across said first capacitor exceeds the breakdown voltage of said breakdown device a plurality of times for each cycle of said sawtooth waveform voltage, whereby said first capacitor is discharged through said breakdown device to produce a series of voltage pulses across said second resistor having a period dependent upon the instantaneous amplitude of said sawtooth waveform voltage, and an output circuit connected to said second resistor, said second resistor having a resistance sufficiently small with respect to the resistance of said first resistor that during the breakdown period of said breakdown device the current through said second resistor is larger than the current through said first resistor, but the resistance of said second resistor is sufficiently large with respect to the resistance of said first resistor that the widths of said voltage pulses are substantially modulated as a function of the instantaneous amplitude of said sawtooth waveform voltage.

References Cited

UNITED STATES PATENTS

| | | | |
|---|---|---|---|
| 3,023,376 | 2/1962 | Smith et al. | 328—150 X |
| 3,048,714 | 8/1962 | Poole | 307—88.5 |
| 3,169,233 | 2/1965 | Schwartz | 307—88.5 |

OTHER REFERENCES

IBM Technical Disclosure Bulletin, vol. 1, No. 6, April 1959.

ARTHUR GAUSS, *Primary Examiner.*

J. S. HEYMAN, *Examiner.*